(12) United States Patent
Dumont et al.

(10) Patent No.: US 7,848,623 B2
(45) Date of Patent: Dec. 7, 2010

(54) VIDEO APPARATUS

(75) Inventors: Frank Dumont, Singapore (SG); Chee Lam Tan, Singapore (SG)

(73) Assignee: Thomson Licensing, Boulogne-Billancourt (FR)

( * ) Notice: Subject to any disclaimer, the term of this patent is extended or adjusted under 35 U.S.C. 154(b) by 1616 days.

(21) Appl. No.: 10/521,491

(22) PCT Filed: Jul. 9, 2003

(86) PCT No.: PCT/EP03/50300

§ 371 (c)(1), (2), (4) Date: Jan. 18, 2005

(87) PCT Pub. No.: WO2004/010713

PCT Pub. Date: Jan. 29, 2004

(65) Prior Publication Data

US 2005/0238106 A1    Oct. 27, 2005

(30) Foreign Application Priority Data

Jul. 18, 2002    (EP) .................................. 02291824

(51) Int. Cl.
*H04N 5/932*    (2006.01)
*H04N 5/935*    (2006.01)
*H04N 5/93*    (2006.01)

(52) U.S. Cl. ........................ 386/201; 386/353

(58) Field of Classification Search ............. 386/1, 386/12, 33–34, 45–46, 83–84, 109, 112, 386/119, 125–126; 348/555, 554, 564, 565
See application file for complete search history.

(56) References Cited

U.S. PATENT DOCUMENTS

| 5,371,551 A * | 12/1994 | Logan et al. ............... 348/571 |
| 5,592,234 A | 1/1997 | Gardner et al. |
| 5,923,379 A | 7/1999 | Patterson |
| 6,154,604 A * | 11/2000 | Iwasaki ..................... 386/131 |
| 6,157,415 A | 12/2000 | Glen |
| 6,285,408 B1 | 9/2001 | Choi et al. |
| 7,111,319 B1 * | 9/2006 | Watkins ..................... 725/139 |

FOREIGN PATENT DOCUMENTS

| EP | 0 932 158 | 7/1999 |
| EP | 1128673 | 8/2001 |
| EP | 1161089 | 12/2001 |

(Continued)

OTHER PUBLICATIONS

Search Report Dated Sep. 16, 2003.

*Primary Examiner*—Thai Tran
*Assistant Examiner*—Nigar Chowdhury
(74) *Attorney, Agent, or Firm*—Robert D. Shedd; Paul P. Kiel; Guy H. Eriksen

(57) ABSTRACT

A video apparatus has a digital decoder generating a first digital stream, a video source of a first analogue signal, a video encoder and a first video decoder connectable to the video source for generating a second digital stream based on the first analogue signal. A switch is coupled to the first video decoder and to the digital decoder to notably mix the second digital stream and the first digital stream into an output digital stream to the video encoder.

15 Claims, 2 Drawing Sheets

FOREIGN PATENT DOCUMENTS

| | | |
|---|---|---|
| JP | 09-163261 | 6/1997 |
| JP | 11-136594 | 5/1999 |
| JP | 11-177884 | 7/1999 |
| JP | 11-215472 | 8/1999 |
| JP | 2000-295527 | 10/2000 |
| WO | WO 01/45426 | 6/2001 |

* cited by examiner

VIDEO APPARATUS

This application claims the benefit, under 35 U.S.C. §365 of International Application PCT/EP03/50300, filed Jul. 9, 2003, which was published in accordance with PCT Article 21(2) on Jan. 29, 2004 in English and which claims the benefit of European patent application No. 02291824.7, filed Jul. 18, 2002.

The invention relates to a video apparatus.

Video apparatus using digital video data are now widely used. In these machines, a digital video decoder (for instance a MPEG decoder) decodes an incoming stream (for instance a MPEG stream received from a satellite or read on a medium such as DVD or hard disk) into a first digital stream (for instance a 4:2:2 digital stream according to the ITU-R BT.656 standard), which is then converted into a viewable analogue signal by a video encoder.

Conventionally, analogue signals from another source can be inserted into the viewable analogue signal before display, for instance to get a picture-in-picture (PIP). When the analogue signals to be inserted can come from several sources and under several formats (for instance CVBS, S-Video and RGB), this solution requires analogue mixers of several types and complex connections to encompass every possible combination of video signals.

Further, this solution has the drawback that the mixed signal is available as an analogue signal (or needs a further digital encoder circuit to output it as a digital stream) whereas it would be desirable nowadays to have it available also as a digital stream without extra cost.

The invention notably seeks to solve these problems.

The invention proposes a video apparatus comprising a digital decoder generating a first digital stream, a video source of a first analogue signal, a video encoder, a first video decoder connectable to the video source for generating a second digital stream based on the first analogue signal and mixing means coupled to the first video decoder and to the digital decoder able to mix the second digital stream and the first digital stream into an output digital stream to the video encoder.

According to preferred embodiments:

a digital encoder generates a third digital stream based on a second analogue signal and the digital encoder is connectable to the digital decoder for transmitting said third digital stream to the digital decoder;

the digital encoder includes a video decoder for digitising the second analogue signal;

the digital encoder and the digital decoder are linked via a digital selector;

the digital selector is connected to a medium interface.

The invention also proposes a video apparatus comprising a first video decoder generating a first digital stream based on a first analogue video signal, a second video decoder generating a second digital stream based on a second analogue video signal, a digital processing unit at least connectable to the second video decoder and able to generate a third digital stream based on the second digital stream and a digital switch connected to the first video decoder and to the digital processing unit for selectively outputting to a video encoder the first digital stream or the third digital stream as an output digital stream.

According to preferred embodiments:

the video encoder outputs an output analogue signal based on said output digital stream;

the digital processing unit includes a medium interface;

the medium interface is connectable to the second video decoder for recording on said medium data based on said second digital stream;

the medium interface is connectable to the digital switch for outputting to said digital switch a digital stream based on data retrieved from the said medium.

The invention and other features thereof will be understood in the light of the following description made with reference to the attached drawing where:

In the following description, signals are represented and described as carried on a single wire even if a plurality of wires are needed for the sake of conciseness.

Figure 1:
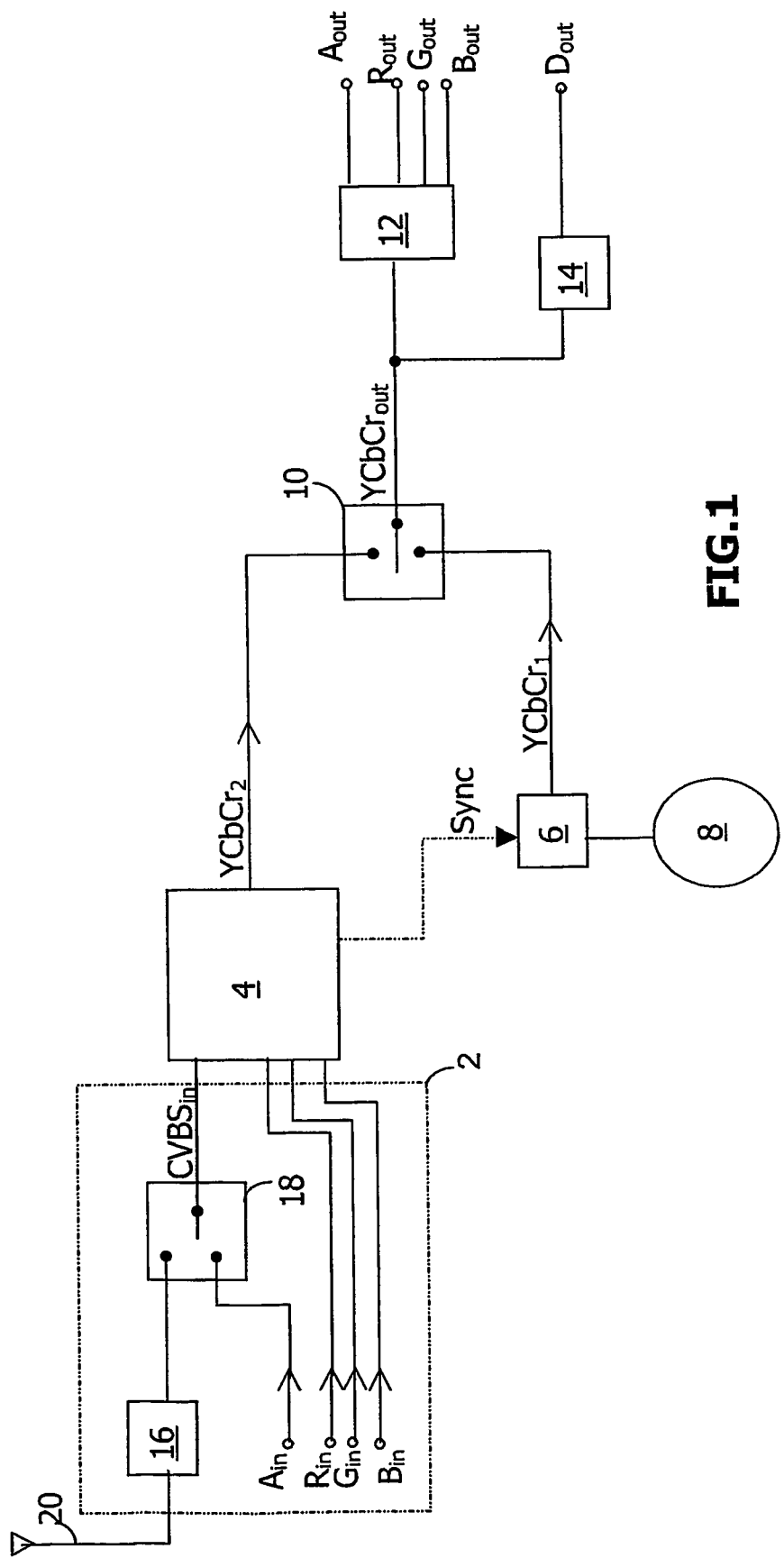
FIG. 1 represents the schematic diagram of a video apparatus.

FIG. 1 represents a video apparatus incorporating a DVD player and a tuner. Such kind of video apparatus is particularly interesting for use with a display which does not include a tuner, such as for instance some plasma displays.

The video apparatus has a source of analogue video signals 2 which includes a tuner 16 (precisely a tuner front-end) which generates CVBS signals from signals received on an antenna 20 and a Scart connector with pins $A_{in}$, $R_{in}$, $G_{in}$ and $B_{in}$ meant to carry respectively a CVBS signal and RGB signals received from another device, for instance a digital set-top box.

The source of analogue video signals 2 also includes an analogue switch 18 to select which CVBS signal among the output of the tuner 16 and the Scart connector signal $A_{in}$ should be used as an output $CVBS_{in}$.

The analogue signals at the output of the analogue video source 2 are transmitted to a video decoder 4 (for instance an SM7118 IC from the company Philips) in order to generate a digital stream $YCbCr_2$ according to the ITU-R BT.656 standard (4:2:2 stream) which digitally represents the same video sequence as the selected analogue signal.

On the other hand, the video apparatus also comprises a DVD reader 8 which reads a MPEG stream from a DVD and transmits this MPEG stream to a MPEG decoder 6, for instance a Sti5519. Other types of medium reader can of course be used instead of the DVD reader, as for instance a hard disk drive (HDD). Based on the MPEG stream received from the DVD reader (i.e. the medium interface) 8, the MPEG decoder 6 outputs a 4:2:2 digital stream $YCbCr_1$. The digital stream $YCbCr_1$ is thus a digital representation of the video sequence taken from the disk according to the same format as the digital stream $YCbCr_2$ output by the video decoder 4.

A digital switch 10 receives on a first input the digital stream $YCbCr_2$ from the video decoder 4 and on a second input the digital stream $YCbCr_1$ from the digital decoder 6. Depending on a control from a microprocessor (not represented) of the video apparatus as further explained below, the digital switch 10 selectively outputs one of the digital streams $YCbCr_1$ and $YCbCr_2$ as an output digital stream $YCbCr_{out}$.

The digital switch 10 (and notably its output carrying the output digital stream $YCbCr_{out}$) is connected on the one hand to a video encoder 12 and on the other hand to a DVI interface 14.

Based on the output digital stream $YCbCr_{out}$, the video encoder 12 outputs (after notably digital-to-analogue conversion) viewable analogue video signals to a Scart connector with pins $A_{out}$ (carrying a CVBS signal) and pins $R_{out}$, $G_{out}$ and $B_{out}$ (carrying RGB signals). By connecting a video display to this last Scart connector, the video sequences represented by the output digital stream $YCbCr_{out}$ can be viewed. The CVBS signal or RGB signals can be used, depending on the user's preference.

Besides, the DVI interface 14 converts the output digital stream $YCbCr_{out}$ according to the DVI format and outputs corresponding data on a digital connector $D_{out}$, for connection to another digital device, for instance to a personal computer.

The digital switch 10 can be controlled by the microprocessor according to two main modes.

In a first mode, the digital switch 10 is used to select the video sequence to be output by the video apparatus according to the user's choice.

As a first example, if the user wants to watch a channel from the tuner 16 on his plasma display connected to the $R_{out}$, $G_{out}$, $B_{out}$ pins of the Scart connector, the microprocessor will instruct the analogue switch 18 to connect the tuner 16 to the video decoder 4, the video decoder 4 to use the $CVBS_{in}$ input as a source, and the digital switch 10 to use the output $YCbCr_2$ of the video decoder 4 as the output digital signal $YCbCr_{out}$.

As a second example, if the user wants to watch a movie from a DVD, the microprocessor instructs the digital switch 10 to use the output $YCbCr_1$ of the MPEG decoder 6 as the output digital signal $YCbCr_{out}$.

In a second mode, the digital switch 10 is used to mix video signals in a picture-in-picture fashion. For instance, the user may request superimposition of a scaled-down picture from the tuner 16 on the video sequence played from the DVD.

To realise this, the microprocessor instructs the video decoder 4 to generate the digital stream $YCbCr_2$ scaled down (see scaler function in the SAA7118 IC from the company Philips) and synchronised to the MPEG decoder 6 (thanks to synchronisation signals Sync transmitted to the MPEG decoder 6 from the video decoder 4). The microprocessor then controls the digital switch 10 to superimpose the active part of the digital stream $YCbCr_2$ on the digital stream $YCbCr_1$, as described for instance in patent application WO 95/35 625.

As another example for the second mode, the scaled $YCbCr_1$ could be coming from the MPEG decoder 6 instead. The synchronisation signals Sync remain however coming from the video decoder 4.

Figure 2:
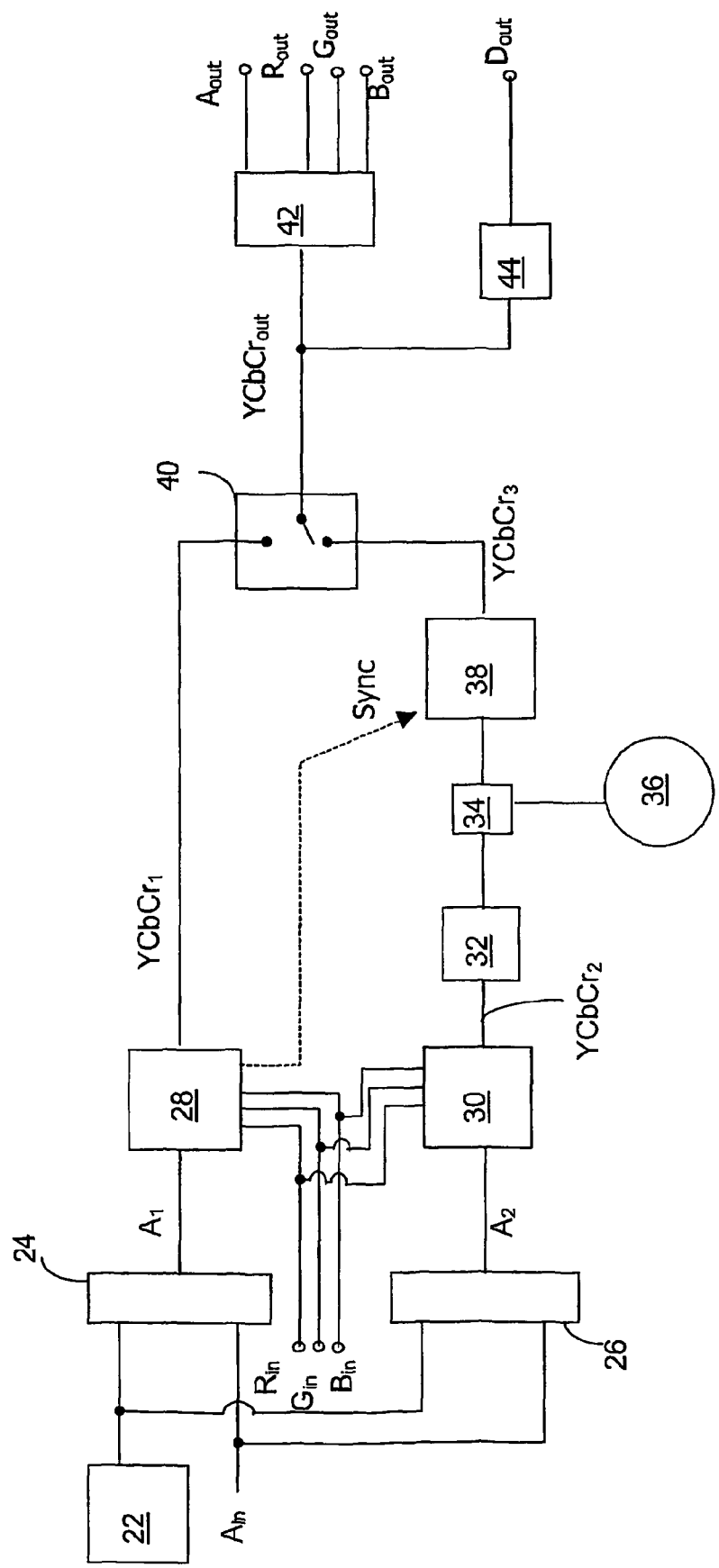
FIG. 2 represents the schematic diagram of a digital video recorder.

FIG. 2 represents a digital video recorder according to the invention.

The digital video recorder has an analogue tuner and demodulator front-end 22 generating a CVBS signal. The video recorder also receives analogue video signal on a first Scart connector having pins $A_{in}$ to carry a CVBS signal and $R_{in}$, $G_{in}$, $B_{in}$ to carry RGB signals. The first Scart connector is for instance connected to a set-top box.

The digital video recorder comprises two selectors 24 and 26. Selector 24 selectively outputs the analogue signal from the front-end 22 or from pin $A_{in}$ of the first Scart connector as a first analogue video signal $A_1$. Similarly, selector 26 selectively outputs the analogue signal from the front-end 22 or from pin $A_{in}$ of the first Scart connector as a second analogue video signal $A_2$.

Each selector 24, 26 could have more inputs without modifying the explanation below and the invention is thus adapted to any number of analogue inputs.

The first analogue video signal $A_1$ is forwarded to a first video decoder 28 which also receives the RGB signals from pins $R_{in}$, $G_{in}$, $B_{in}$. Depending on instructions from a microprocessor, the first video decoder 28 can convert either the first analogue video signal $A_1$ or the RGB signals into a first digital stream $YCbCr_1$ (4:2:2 stream) according to the ITU-R BT.656 standard.

Similarly, the second analogue video signal $A_2$ is forwarded to a second video decoder 30 which also receives the RGB signals from pins $R_{in}$, $G_{in}$, $B_{in}$ and the second video decoder 30 can thus convert either the second analogue video signal $A_2$ or the RGB signals into a second 4:2:2 digital stream $YCbCr_2$.

In an alternative embodiment (not represented), if several sources of RGB signals were available, two RGB switches could be used to select respectively which RGB signals should be transmitted to the first video decoder and to the second video decoder, in a similar way as the selectors 24 and 26 select which CVBS signals should be transmitted to the first and second video decoders.

A MPEG encoder 32 is coupled to the second video decoder 30 in order to convert the second digital stream $YCbCr_2$ into a MPEG stream.

A digital selector 34—as the one described in patent application EP 1 128 673 under the wording "multiplexer"—allows various connections between the MPEG encoder 32, a medium interface 36 and a MPEG decoder 38.

The medium interface 36 is for instance a hard disk drive (HDD) which can record on a hard disk the MPEG stream from the MPEG encoder 32 and retrieve from the hard disk a MPEG stream which is then passed to the MPEG decoder 38.

Alternative types of medium interface 36 can be used, for instance a DVD recorder unit.

Thanks to the digital selector 34, the MPEG decoder can alternatively decode the MPEG stream retrieved from the hard disk (i.e. the digital stream from the medium interface) or the MPEG stream generated by the MPEG encoder 32. Based on the selected MPEG stream, the MPEG decoder 38 outputs a 4:2:2 digital stream (third digital stream) $YCbCr_3$.

A digital switch 40 receives on a first input the first digital stream $YCbCr_1$ and on a second input the third digital stream $YCbCr_3$. The digital switch 40 is controlled by the microprocessor (not represented) to selectively output the first digital stream $YCbCr_1$ or the third digital stream $YCbCr_3$ as an output digital stream $YCbCr_{out}$ to a video encoder 42 and to a DVI interface 44.

Based on the output digital stream $YCbCr_{out}$, the video encoder 42 outputs (after notably digital-to-analogue conversion) viewable analogue video signals to a second Scart connector with pins $A_{out}$ (carrying a CVBS signal) and pins $R_{out}$, $G_{out}$ and $B_{out}$ (carrying RGB signals). By connecting a video display to this second Scart connector, the video sequences represented by the output digital stream $YCbCr_{out}$ can be viewed. The CVBS signal or RGB signals can be used, depending on the user's preference.

Besides, the DVI interface 44 converts the output digital stream $YCbCr_{out}$ according to the DVI format and outputs corresponding data on a digital connector $D_{out}$, for instance for connection to a digital video camera or a personal computer.

The digital switch 40 can be controlled by the microprocessor according to two main modes.

In a first mode, the digital switch 40 is used to select the video sequence to be output by the video apparatus according to the user's choice. For instance, if the user wants to watch the analogue CVBS signal received on the first Scart connector while recording the analogue signal from the front-end 22, the first selector 24 is controlled to connect pin $A_{in}$ to the first video decoder 28 and the digital switch 40 to connect the first video decoder 28 to the video encoder 42; at the same time, the second selector 26 is controlled to connect the output of front-end 22 to the second video decoder 30, which digital output stream $YCbCr_2$ is converted into a MPEG stream (at MPEG encoder 32) and recorded in the HDD 36.

In a second mode, the digital switch 40 is used to mix video signals in a picture-in-picture fashion. For instance, the user may request superimposition of a scaled-down picture from the front-end 22 on a video sequence received as RGB signals on the first Scart connector (for instance a video sequence received from a personal computer).

To realise this, the microprocessor instructs the first selector 24 to connect the front-end 22 to the first video decoder 28 and the first video decoder 22 to generate the digital stream $YCbCr_1$ scaled down (see scaler function in the SAA7118 IC from the company Philips) and synchronised to the MPEG decoder 38 (thanks to synchronisation signals Sync transmitted to the MPEG decoder 38 from the first video decoder 28). The microprocessor also instructs the second video decoder 30 to use signals from the RGB inputs ($R_{in}$, $G_{in}$, $B_{in}$) and the digital selector 34 to connect the MPEG encoder 32 to the MPEG decoder 38, so that the video sequence from the RGB inputs once digitised is passed to the digital switch 40 as a third digital stream $YCbCr_3$. The microprocessor controls the digital switch 10 to superimpose the active part of the digital stream $YCbCr_1$ on the digital stream $YCbCr_3$, as described for instance in patent application WO 95/35 625.

As a second example for this mode, the scaled $YCbCr_3$ could be coming from the MPEG decoder 38 instead. The synchronisation signals Sync remain however coming from video decoder 28.

These examples clearly show that the construction proposed by the invention allows mixing of incoming analogue signals of any kind without the need for complex analogue switches. Of course, mixing of an incoming analogue signal (e.g. for front-end 22) with a digital source (e.g. HDD 36) is also possible (first video decoder 28 digitises front-end output and digital switch 40 mixes this digitised stream with output of MPEG decoder 38).

Further, this construction has the advantage that the mixed video sequence is readily available as a digital stream ($YCbCr_{out}$), which is more and more useful nowadays.

Lastly, when receiving two analogue video signals, even when no mixing occurs, the provision of two video decoders 28, 30 allows digitising one of the analogue signals for a first purpose, for instance viewing with picture improvement (via first video decoder 28 and video encoder 42 according to the technique proposed in patent application EP 1 128 673), and digitising the second analogue signal for a second purpose, for instance recording (via second video decoder 28 and MPEG encoder 32).

The invention maximises the ways the video apparatus can operate with a reduced amount of circuitry.

The invention claimed is:

1. Video apparatus comprising:
   a digital decoder for decompressing compressed digital data and for generating a first digital stream;
   a video source of a first analogue signal;
   a video encoder;
   a first video decoder connectable to the video source for generating a second digital stream based on the first analogue signal;
   mixing means coupled to the first video decoder and to the digital decoder able to mix the second digital stream and the first digital stream into an output digital stream to the video encoder, wherein
   the first video decoder provides a synchronizing signal to the digital decoder.

2. Video apparatus according to claim 1, wherein a digital encoder generates a third digital stream based on a second analogue signal and wherein the digital encoder is connectable to the digital decoder for transmitting said third digital stream to the digital decoder.

3. Video apparatus according to claim 2, wherein the digital encoder includes a video decoder for digitising the second analogue signal.

4. Video apparatus according to claim 3, wherein the digital encoder and the digital decoder are linked via a digital selector.

5. Video apparatus according to claim 4, wherein the digital selector is connected to a medium interface.

6. Video apparatus according to claim 2, wherein the digital encoder and the digital decoder are linked via a digital selector.

7. Video apparatus according to claim 6, wherein the digital selector is connected to a medium interface.

8. Video apparatus comprising:
   a first video decoder generating a first digital stream based on a first analogue video signal;
   a second video decoder generating a second digital stream based on a second analogue video signal;
   a digital processing unit at least connectable to the second video decoder and able to generate a third digital stream based on the second digital stream;
   a mixing means connected to the first video decoder and to the digital processing unit for outputting to a video encoder an output digital stream generated from the first digital stream and the third digital stream, wherein
   the first video decoder provides a synchronizing signal to the digital decoder.

9. Video apparatus according to claim 8, wherein the video encoder outputs an output analogue signal based on said output digital stream.

10. Video apparatus according to claim 9, wherein the digital processing unit includes a medium interface.

11. Video apparatus according to claim 10, wherein the medium interface is connectable to the second video decoder for recording on said medium data based on said second digital stream.

12. Video apparatus according to claim 10, wherein the medium interface is connectable to the digital switch for outputting to said digital switch a digital stream based on data retrieved from said medium.

13. Video apparatus according to claim 8, wherein the digital processing unit includes a medium interface.

14. Video apparatus according to claim 13, wherein the medium interface is connectable to the second video decoder for recording on said medium data based on said second digital stream.

15. Video apparatus according to claim 13, wherein the medium interface is connectable to the digital switch for outputting to said digital switch a digital stream based on data retrieved from said medium.

* * * * *